Oct. 16, 1962    G. L. SWARTWOOD    3,059,045
MOUNTING MEANS FOR A WIRING DEVICE
Filed July 8, 1960

WITNESSES
John E. Heasley, Jr.
Edward F. Possessky

INVENTOR
Gerald L. Swartwood
BY
ATTORNEY

3,059,045
MOUNTING MEANS FOR A WIRING DEVICE

Gerald L. Swartwood, Monroe, Conn., assignor to The Bryant Electric Company, Bridgeport, Conn., a corporation of Connecticut
Filed July 8, 1960, Ser. No. 41,602
4 Claims. (Cl. 174—53)

The present invention relates to wiring devices and more particularly to means for mounting the same.

Wiring devices are ordinarily employed with conductors which form a circuit for the purpose of controlling the conduction of electric energy through the circuit or for the purpose of enabling the electric energy to be distributed to load apparatus. To provide for positioning a wiring device relative to its support when placed in use, a mounting member, often referred to as a yoke, is ordinarily utilized.

In addition to providing generally physical support for a wiring device, the employed mounting means, or a yoke as just exemplified, can be arranged to serve additional functions of a more specific nature. For an example, in many applications it is desirable that the yoke, adjacent its ends, be provided with detachable portions for eventual use as spacers between the yoke to its adjacent support. Thus, in an application (commonly referred to as surface mounting) in which a wiring device is to be mounted within a supporting box, which in turn can be mounted upon a wall surface or the like, the detachable portions can be used to position the yoke relative to the box so as to level properly the wiring device relative to the side of the box through which it faces.

In an application in which the wiring device is to be mounted adjacently of the open side of a supporting box, which in turn can be mounted to have its open side face outwardly through a wall surface or the like, it is desirable that the yoke be provided with portions which generally extend over or cover the adjacent area of the wall surface for support by the same so as to enable the wiring device to be held generally even with the wall surface and adjacently of the open box side. Providing the latter support portions on the yoke becomes particularly important if the wall within which the supporting box is mounted is formed from a material such as plaster. In such an instance, the wiring device can be supported to be generally even with the surface of the wall irrespectively of irregularities or voids which might exist in the wall surface adjacently of the supporting box. Of course, it is desirable that a yoke be provided with means both for providing wall coverage and for enabling portions to be removed for spacing purposes so that it can have general utility including usage in both of the exemplified applications even though, ordinarily, wall coverage portions would be so extended as to preclude a proper fitting of the yoke relative to its box in the aforementioned surface mounting application.

Thus, it is an object of the invention to provide novel means for mounting a wiring device.

It is another object of the invention to provide a novel wiring device yoke having removable portions usable as spacers yet having means providing substantial plaster coverage if the portions are not removed.

Still another object of the invention is to provide a novel wiring device yoke having a portion which is substantially sized at least for the purpose of providing wall coverage yet which is removable for applications in which wall coverage is not required.

It is another object of the invention to provide a novel wiring device yoke as set forth in the preceding object, with the removable portion being formed to provide elements usable as spacers.

These and other objects of the invention will become more apparent upon consideration of the following detailed description of the invention along with the attached drawing, in which.

Figure 1:
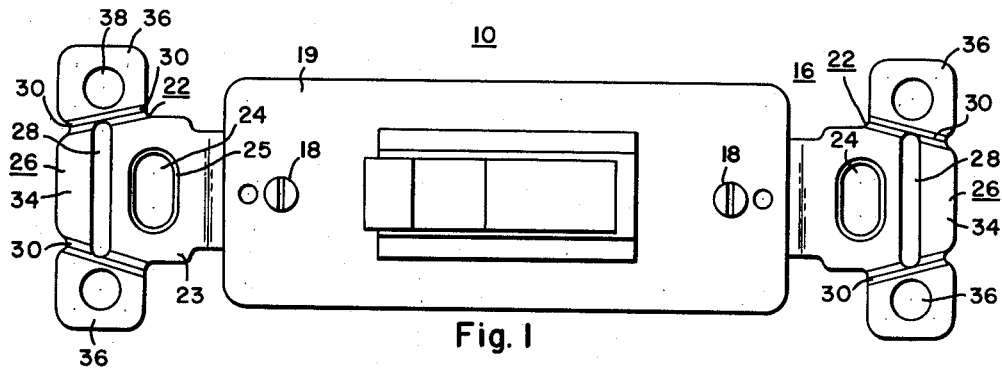
FIGURE 1 is a top plan view of a wiring device, here a switch, including a yoke constructed in accordance with the principles of the invention.
Figure 3:
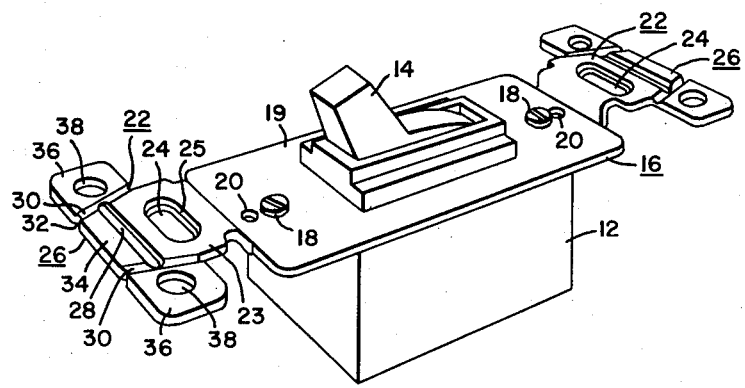
FIGURE 3 is a perspective view of the wiring device shown in FIGURE 1.

With reference to FIG. 1, a wiring device 10, here a switch, is provided for connection to circuit conductors (not shown), here for the purpose of controlling the circuit continuity. The switch 10 includes an insulative member 12 (as viewed in FIG. 3) for housing its operative elements. A handle member 14 is assembled with the insulative member or housing 12 for enabling the operative elements of the switch 10 to be actuated.

An elongated yoke member 16 is employed here to provide means for securing or mounting the switch 10 or other wiring device relative to a suitable support (not shown), such as one of the aforementioned boxes. Means, in this example in the form of screws 18 threadedly engageable with the housing 12, are provided for securing the yoke 16 to the housing 12. In addition, a central body portion 19 of the yoke 16, in this case in overlying relation with the housing 12, is provided with openings 20 for the purpose of receiving face plate fasteners (not shown) and with an enlarged opening 21 for the purpose of enabling the yoke 16 to be positioned relative to the operative elements of the switch 10 as required, and in this instance, for the purpose of enabling the handle 14 to be positioned for access.

Figure 2:
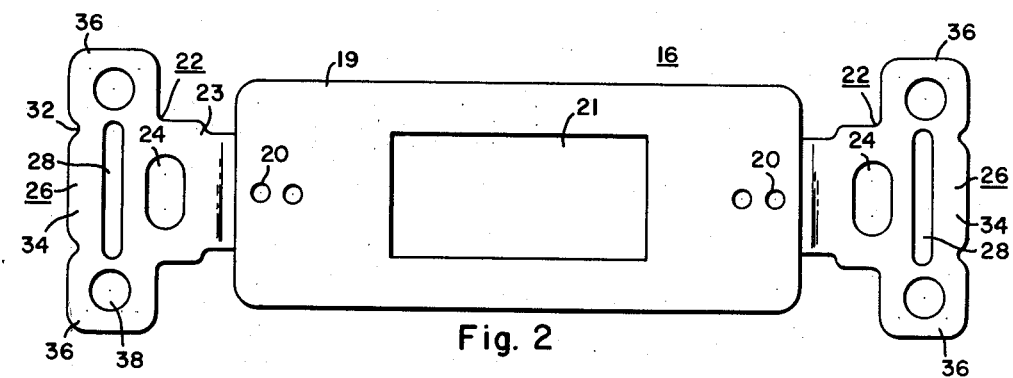
FIGURE 2 is a bottom plan view of the yoke shown in FIGURE 1.

The yoke 16 is provided with an ear 22 adjacent each of its ends. The ear 22 includes a fastening portion 23 having an opening 24, which can be beveled if desired as indicated by the reference character 25, for receipt of a screw or fastener (not shown) used in mounting the switch 10 relative to its aforementioned support. Included integrally as a part of the ear 22, is a portion 26 for, among other objects, providing a substantial amount of wall coverage. Through the use of a slot 28 and elongated grooves 30, means are provided for enabling the wall coverage portion 26 to be readily removed from the yoke 16. If desired, notches 32 can be extended inwardly from the end of the ear 22 so as to adjoin the grooves 30 for the purpose of increasing the removability of the wall coverage portion 26. Of course, as can be ascertained from observing FIG. 2, the grooves 30 are desirably, but are not necessarily, provided only on one side of the yoke 16, here the top side.

The wall coverage portion 26 includes a bar portion 34 being positioned adjacently of the slot 28 and extending laterally of the yoke 16 between the spaced grooves 30. In addition, portions 36 are also included with the wall coverage portion 36 for use as spacers when removed from the yoke 16. Each spacer or washer portion 36 is formed outwardly of its adjacent groove 30 and is provided with an opening 38 for mating with a screw or fastener. Thus, the washer portions 36, when removed, can be used, for example, as spacers subjacently of the ear opening 24.

It is to be noted that the wall coverage portion 26, including the bar portion 24 and the washer portions 36, provides substantial yoke material for wall coverage for applications in which this result is desired. By simply deflecting or bending the washer portions 36 generally about the grooves 30 as pivot axes, the entire wall coverage portion 26 can be removed and the washer portions 36 are provided as individual elements usable as spacers. Of course, since the grooves 30 are extended generally longitudinally of the yoke 16, removal of the wall coverage portion 26 cannot result from any forces about a pivot axis extending generally transversely of the yoke 16.

It is also to be noted that the slot 28 is extended into the grooves 30 so as to enable the bar portion 34, and therefore the entire wall coverage portion 26, to be removed when the washer portions 36 are deflected in the manner previously described. Thus, in applications in which the switch or wiring device 10 is to be supported relative to a box mounted subjacently of the surface of its support or wall the wall coverage portion 26 of the yoke 16 can be used for supporting the switch or wiring device 10 to be generally even with the surface of the support or wall. If the supporting box is surface mounted, the wall coverage portion 26 can be removed to enable the yoke 16 to fit properly within the surface box and, in addition, to provide the washer portions 36 for use as spacers.

In the foregoing description the mode of operation of an arrangement of specific elements has been related to point out the principles of the invention. The description, therefore, has only been illustrative of the invention, and, accordingly, it is desired that the invention be not limited by the arrangement described here but, rather, that it be accorded an interpretation consistent with the scope and spirit of its broad principles.

What is claimed is:

1. A wiring device comprising an elongated mounting member, said mounting member including at least adjacently of one of its ends a fastener portion enabling said wiring device to be mounted upon a support, and plaster coverage means having an elongated transverse portion spaced longitudinally outwardly of said fastener portion, said plaster coverage means in addition having a washer portion joined to one end of said transverse portion and joined to said fastener portion, and means for joining the other end of said transverse portion to said fastener portion, a generally longitudinally extending groove being provided along each of the lines of joinder of said washer portion and said fastener portion and said transverse portion and along the line of joinder of said joining means and said fastener portion for the purpose of enabling said plaster coverage means to be removed from said fastener portion and for the purpose of enabling said washer portion to be detachable for separate use.

2. A wiring device comprising an elongated mounting member, said mounting member including at least adjacently of one of its ends a fastener portion enabling said wiring device to be mounted upon a support, and plaster coverage means having an elongated transverse portion spaced longitudinally outwardly of said fastener portion, said plaster coverage means in addition having a washer portion joined to each end of said transverse portion, each of said washer portions being joined to said fastener portion, a generally longitudinally extending groove being provided along each of the lines of joinder of said washer portions and said fastener portions and said transverse portion for the purpose of enabling said plaster coverage means to be removed from said fastener portion and for the purpose of enabling said washer portions to be detachable for separate use.

3. A wiring device comprising an elongated mounting member, said mounting member including adjacently of at least one of its ends an ear for supporting said wiring device, said ear including a longitudinally outermost plaster coverage portion generally extending transversely across said mounting member, said ear also including respective integral washer portions integrally joined with the lateral edges of said plaster coverage portion, and means for enabling said plaster coverage portion to be removed from said ear and for enabling said washer portions to be detached for separate use, said enabling means including a transversely extending elongated slot in said ear adjacently and longitudinally inwardly of said plaster coverage portion, and a groove located inwardly of each washer portion and extended generally longitudinally of said mounting member from each end of said slot both inwardly and outwardly thereof to the outer boundary of said ear.

4. A wiring device comprising an elongated mounting member, said mounting member including at least adjacently of one of its ends a fastener portion enabling said wiring device to be mounted upon a support, and plaster coverage means having an elongated transverse portion spaced longitudinally outwardly of said fastener portion, said plaster coverage means in addition having a washer portion joined to each end of said transverse portion, each of said washer portions being joined to said fastener portion, a generally longitudinally extending groove being provided along each of the lines of joinder of each of said washer portions and said fastener portion and said transverse portion for the purpose of enabling said transverse and washer portions to be removed from said fastener portion.

References Cited in the file of this patent

UNITED STATES PATENTS

| | | |
|---|---|---|
| 2,455,889 | Despard | Dec. 7, 1948 |
| 2,579,841 | Ludwig | Dec. 25, 1951 |
| 2,854,501 | Ludwig | Sept. 30, 1958 |